US010694459B2

(12) United States Patent
Lai et al.

(10) Patent No.: US 10,694,459 B2
(45) Date of Patent: Jun. 23, 2020

(54) POSITIONING ACCESS POINTS SELECTION

(71) Applicant: HEWLETT PACKARD ENTERPRISE DEVELOPMENT LP, Houston, TX (US)

(72) Inventors: Yingchun Lai, Beijing (CN); Xiang Shi, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 217 days.

(21) Appl. No.: 15/556,515

(22) PCT Filed: Mar. 15, 2016

(86) PCT No.: PCT/CN2016/076365
§ 371 (c)(1),
(2) Date: Sep. 7, 2017

(87) PCT Pub. No.: WO2016/146055
PCT Pub. Date: Sep. 22, 2016

(65) Prior Publication Data
US 2018/0049115 A1 Feb. 15, 2018

(30) Foreign Application Priority Data
Mar. 16, 2015 (CN) .......................... 2015 1 0114888

(51) Int. Cl.
H04W 48/20 (2009.01)
H04W 64/00 (2009.01)
(Continued)

(52) U.S. Cl.
CPC ........... *H04W 48/20* (2013.01); *G01S 5/0268* (2013.01); *G01S 5/14* (2013.01); *H04W 48/16* (2013.01); *H04W 64/00* (2013.01); *H04W 84/12* (2013.01)

(58) Field of Classification Search
CPC ........ G01S 5/14; G01S 5/0268; H04W 64/00; H04W 48/16; H04W 48/20; H04W 84/12
See application file for complete search history.

(56) References Cited

U.S. PATENT DOCUMENTS 8,478,298 B1 * 7/2013 Mansour ................. G01S 5/021
455/456.1
2012/0258732 A1 10/2012 Jeong
(Continued)

FOREIGN PATENT DOCUMENTS

CN 102348258 A 2/2012
CN 103379427 A 10/2013
(Continued)

OTHER PUBLICATIONS

International Search Report and Written Opinion, International Application No. PCT/CN2016/076365, dated Jun. 21, 2016, pp. 1-7, SIPO.

*Primary Examiner* — Mandish K Randhawa
(74) *Attorney, Agent, or Firm* — Jaffery Watson Mendonsa & Hamilton

(57) ABSTRACT

A positioning server may acquire at least one candidate AP set from an initial AP set, wherein each of the at least one candidate AP set includes a preset number of APs enclosing a terminal which is to be positioned. The positioning server may select a target AP set from the at least one candidate AP set, wherein a distance from each of the APs included in the target AP set to the terminal is less than a preset threshold. The positioning server may determine the preset number of APs included in the target AP set as positioning APs for positioning the terminal.

12 Claims, 9 Drawing Sheets

(51) Int. Cl.
    *G01S 5/02*    (2010.01)
    *G01S 5/14*    (2006.01)
    *H04W 48/16*   (2009.01)
    *H04W 84/12*   (2009.01)

(56) References Cited

U.S. PATENT DOCUMENTS

| | | |
|---|---|---|
| 2013/0010617 A1 | 1/2013 | Chen et al. |
| 2014/0071847 A1 | 3/2014 | Pantelidou et al. |
| 2014/0334463 A1 | 11/2014 | Ipman et al. |
| 2015/0055492 A1 | 2/2015 | Gao, Jr. et al. |
| 2015/0264536 A1* | 9/2015 | Patil ............... H04W 4/043 455/456.1 |
| 2015/0304816 A1* | 10/2015 | Al-Najjar ............ G01S 5/0252 455/456.1 |
| 2017/0134899 A1* | 5/2017 | Chan ............... H04W 64/00 |

FOREIGN PATENT DOCUMENTS

| | | |
|---|---|---|
| CN | 103491506 A | 1/2014 |
| CN | 104125538 A | 10/2014 |
| CN | 104335064 B | 2/2015 |

\* cited by examiner

POSITIONING ACCESS POINTS SELECTION

BACKGROUND

The disclosure relates to Wireless Local Area Network (WLAN) technology, particularly to a method and device for selecting a positioning access point (AP).

A terminal may move freely in a WLAN and may be positioned on different occasions. For example, a patient may be positioned in medical examination, a target customer may be positioned in a shopping mall, and the storage location of goods may be positioned in intelligent warehousing. WLAN positioning may be applied in some areas outside the covering of the satellite navigation system such as Global Positioning System (GPS) and the Beidou navigation system, and provide support in many application fields.

DETAILED DESCRIPTION OF THE EMBODIMENTS

One or more access points (APs) may be deployed in a wireless local area network (WLAN), and a terminal may access the WLAN through an AP associated with the terminal. By using WLAN technology, terminal positioning may be performed in a WLAN. For example, one way for positioning a terminal may be triangular positioning. In triangular positioning, an AP for positioning a terminal may be selected from multiple APs in a WLAN, the selected AP may be termed as a "positioning AP", the distance from the positioning AP to the terminal may be calculated, and the position of the terminal may be determined based on the coordinates of the positioning AP and the calculated distance. Examples in the disclosure will focus on how to select a positioning AP. The method for selecting a positioning AP according to the disclosure may not only be applicable to the case of performing terminal positioning using the triangular positioning, but also applicable to other terminal positioning techniques.

Figure 1:
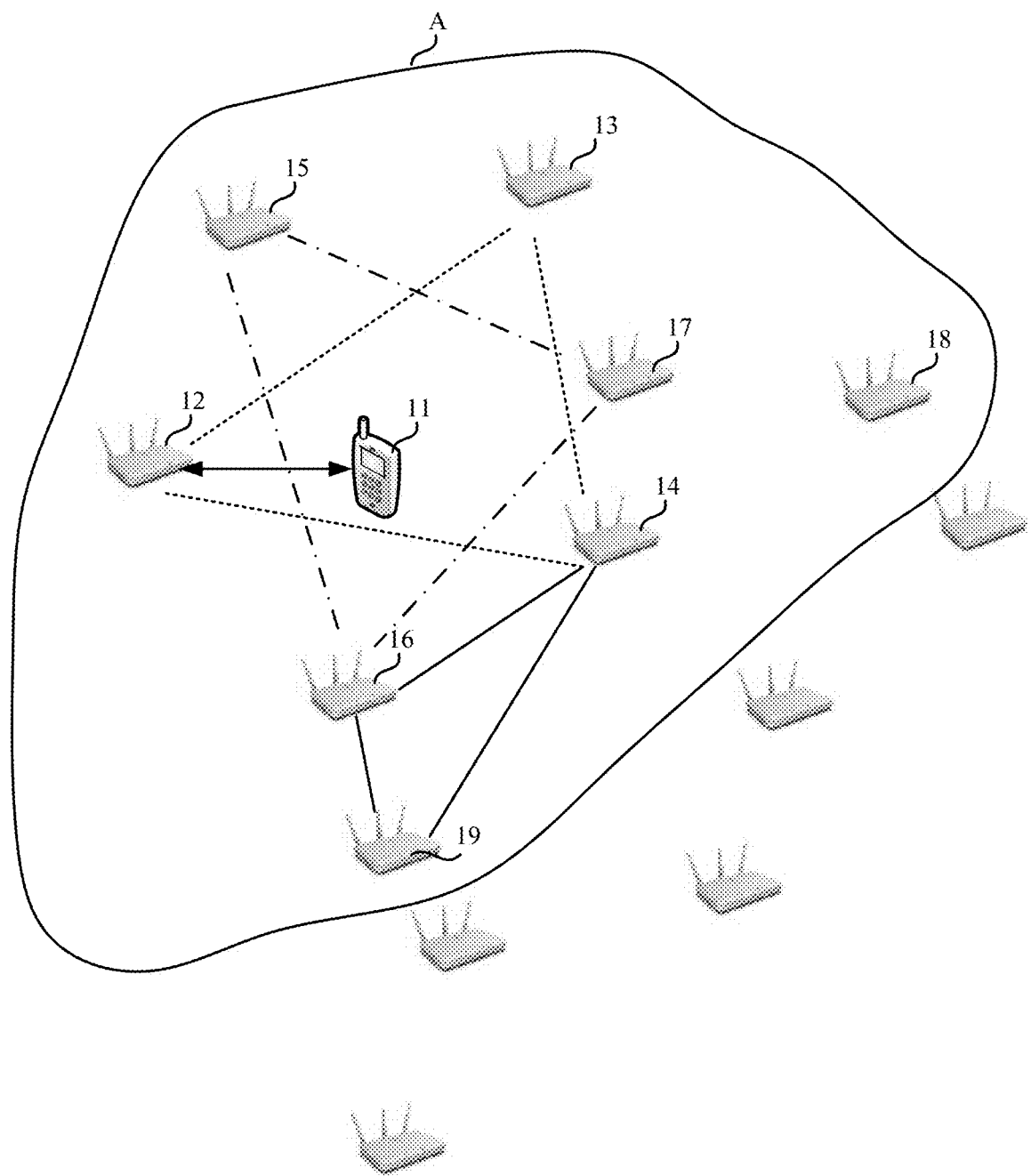
FIG. 1 schematically illustrates a WLAN according to an example of the disclosure.

FIG. 1 is a schematic diagram illustrating a WLAN according to an example of the disclosure.

FIG. 1 shows that a plurality of APs (only some APs in the WLAN are shown) may be deployed in the WLAN and a terminal 11 may associate with one of the APs to access the WLAN. Suppose that the terminal 11 is to be positioned using triangular positioning, a preset number of positioning APs may be selected to be used for terminal positioning as described above. In this example, the preset number may be 3 or more. For example, when the preset number is 4, four positioning APs may be used to calculate the position of the terminal 11 according to a triangular positioning technique. Here, the terminal 11 may be also termed as a "terminal to be positioned".

Figure 2:
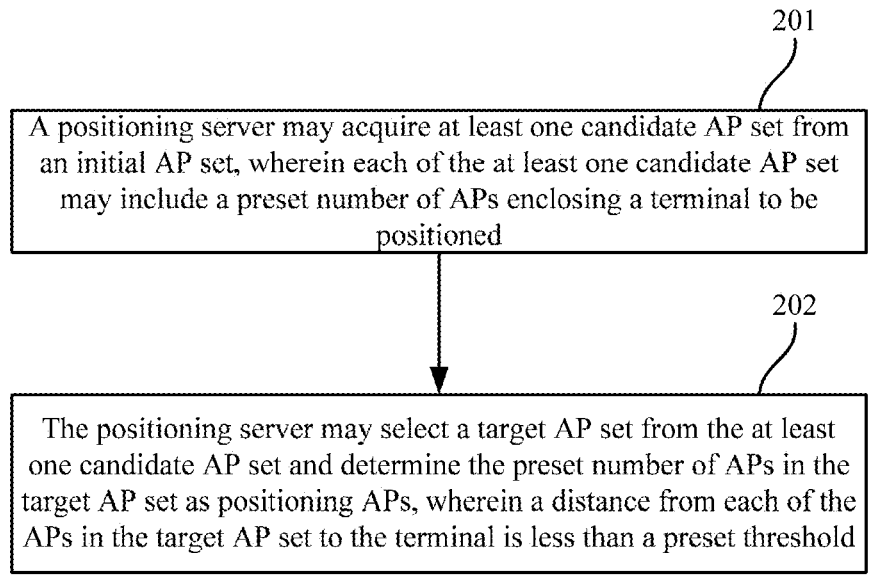
FIG. 2 is a flowchart illustrating a method for selecting a positioning AP according to an example of the disclosure.

FIG. 2 illustrates a method for selecting a positioning AP according to an example of the disclosure. As illustrated in FIG. 2, the method may include the following blocks.

At block 201, a positioning server may acquire at least one candidate AP set from an initial AP set, wherein each of the at least one candidate AP set may include a preset number of APs enclosing a terminal to be positioned.

At block 202, the positioning server may select a target AP set from the at least one candidate AP set, wherein, a distance from each of the AP included in the target AP set to the terminal is less than a preset threshold, and may determine the preset number of APs in the target AP set as positioning APs for positioning the terminal.

According to the method for selecting a positioning AP as illustrated in FIG. 2, at least one candidate AP set may be acquired from an initial AP set, wherein the initial AP set may include part or all of APs in the WLAN which the terminal to be positioned accesses. For example, suppose that FIG. 1 shows all of APs in the WLAN, the initial AP set may include all the APs, or may only include some APs enclosed by the circle A. When the initial AP set only include some APs, these APs may be selected in the following way. Firstly, according to an AP associated with the terminal 11 such as AP 12, the initial position of the terminal 11 may be roughly determined. Then, the APs relatively closer to the initial position of the terminal 11 may be selected. As illustrated in FIG. 1, APs inside the circle A may be selected, but remaining APs outside the circle A may not be selected for being relatively farther from the terminal 11. This is because, if an AP far from the terminal to be positioned is used for terminal positioning, the calculation precision may decrease thereby influencing the accuracy of the terminal positioning. In other words, either part or all of APs may be selected as an initial AP set, however, when part of APs are selected as the initial AP set, the complexity for the positioning calculation may be reduced so as to improve the positioning efficiency.

In block 201, at least one candidate AP set including a preset number of APs may be acquired from the initial AP set. For example, when the preset number is three, three positioning APs are used in triangular positioning. As illustrated in FIG. 1, there are three AP sets: J1 [AP 12, AP 13, AP 14], J2 [AP 15, AP 16, AP 17] and J3 [AP 14, AP 16, AP 19]. Here, the three AP sets of J1, J2 and J3 are only illustrative and not limited.

In the three AP sets, J1 and J2 may be selected as candidate AP sets, but J3 may not be selected. This is because as a candidate AP set, it should enclose the terminal to be positioned.

The term "enclose" means that, when APs in an AP set are sequentially connected to form a polygon, the terminal to be positioned is located within the polygon. As illustrated in FIG. 1, AP 12, AP 13 and AP 14 which are connected by a dotted line may enclose the terminal 11 to be positioned. Apparently, AP 14, AP 16 and AP 19 which are connected by a solid line cannot enclose the terminal 11. In triangular positioning calculation, selecting the positioning APs enclosing the terminal to be positioned may obtain a more accurate positioning result in comparison with the case that the positioning APs cannot enclose the terminal to be positioned.

At block 202, a target AP set may be selected from the at least one candidate AP set acquired in block 201, wherein an AP in the target AP set may be used as a positioning AP, and a distance from the target AP set to the terminal is less than a preset threshold. The preset threshold may indicate that a candidate AP set is selected as close to the terminal to be positioned as possible. Referring to FIG. 1, suppose that the AP set of [AP 15, AP 18, AP 19] is selected as a candidate AP set, although the terminal 11 may be also enclosed by this AP set, this AP set is apparently farther from the terminal 11 than J2 [AP 15, AP 16, AP 17]. The circle formed by AP 15, AP 16 and AP 17 in J2 equals to an inner enclosure relatively closer to the terminal 11, while the AP set of [AP 15, AP 18, AP 19] may form an outer enclosure relatively farther from the terminal 11.

Since the distance from the positioning AP to the terminal is to be measured in triangular positioning, and according to the principle of signal attenuation, the distance measuring may be more accurate when the positioning AP is relatively closer to the terminal, a candidate AP set may be selected as close to the terminal 11 as possible. According to the examples of the disclosure, a threshold which represents a distance closer to the terminal 11 may be preset. Based on the preset threshold, an AP set relatively farther from the terminal 11 may be excluded from the at least one candidate AP set acquired in block 201, such that a candidate AP set closer to the terminal 11 may be obtained as a target AP set among the at least one candidate AP set. The target AP set may be, for example, a candidate AP set closest to the terminal 11, or a candidate AP set which is still closer to the terminal 11 although not being the closest.

By processes in blocks 201 and 202, a target AP set including a preset number of positioning APs may be obtained. The positioning APs in the target AP set may enclose the terminal to be positioned and be closer to the terminal to be positioned, such that the positioning calculation result may be more accurate for the terminal to be positioned.

Figure 3:
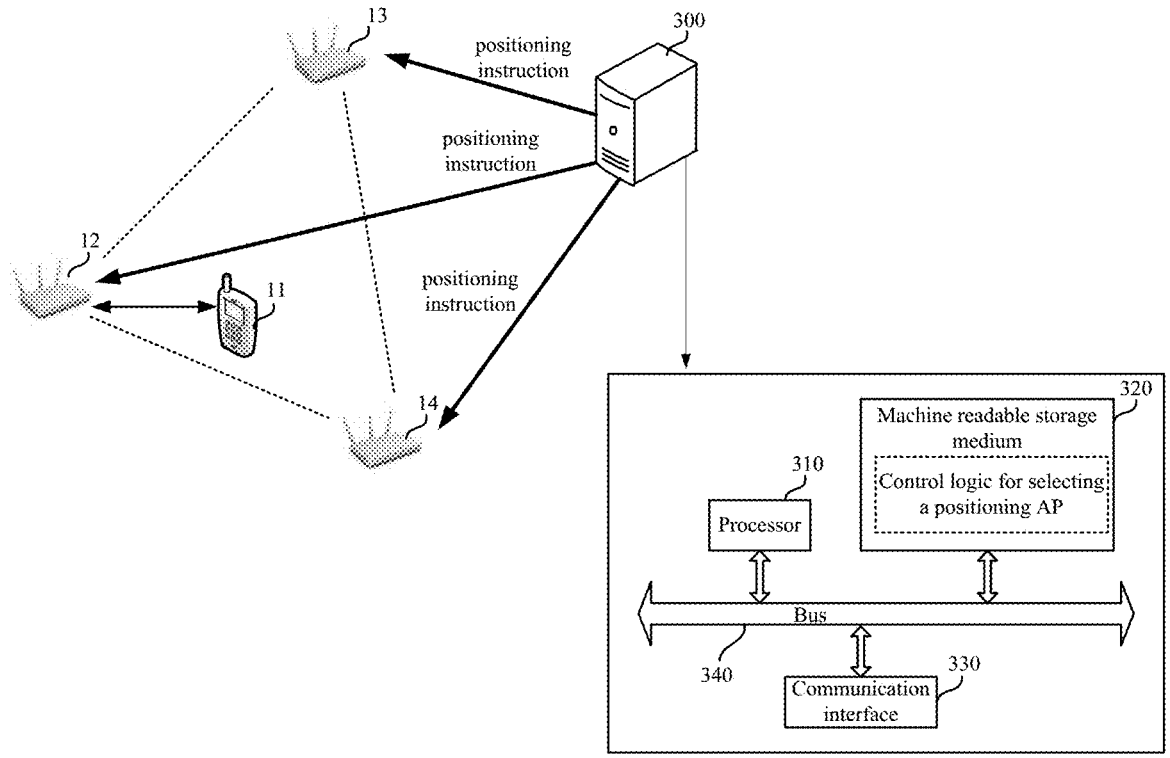
FIG. 3 is a schematic diagram illustrating how a positioning server positions a terminal according to an example of the disclosure.

The process of selecting a positioning AP as illustrated in FIG. 2 may be performed by calculation on a positioning server. FIG. 3 schematically illustrates how a positioning server positions a terminal according to an example of the disclosure. In FIG. 3, the AP set of [AP 12, AP 13, AP 14] is taken as an example to describe the process of positioning a terminal by a positioning server 300.

The coordinates of each of the APs deployed in the WLAN are known on the positioning server. For example, after the APs are deployed, the coordinates of each of the APs may be stored onto the positioning server. The positioning server may acquire an initial position of the terminal to be positioned, wherein the initial position may be roughly estimated according to an AP associated with the terminal to be positioned. For example, when the terminal to be positioned associates with an AP, the AP may record information (such as terminal identification) about the terminal to be positioned and transmit the information to an upper layer device such as an access controller (AC). For example, the AP may upload the information about the terminal to be positioned onto the AC so that the AC may learn which AP is associated with the terminal to be positioned. The AC may also transmit the information about the AP associated with the terminal to be positioned to the positioning server. Since the coordinates of each of the APs are known to the positioning server, and each of the APs has certain coverage, and a terminal may associate with an AP only when the terminal is in the coverage of the AP, thus the initial position of the terminal to be positioned may be roughly estimated.

Since the coordinates of each of the APs and the initial position of the terminal to be positioned have been known, the positioning server may perform the process as illustrated in FIG. 2, so as to acquire positioning APs enclosing the terminal to be positioned and closer to the terminal to be positioned. Suppose that the positioning server 300 determines AP 12, AP 13 and AP 14 illustrated in FIG. 3 as positioning APs, the positioning server 300 may transmit a positioning instruction to the positioning APs. The positioning APs may transmit a packet to the terminal to be positioned according to the positioning instruction, and measure parameters corresponding to the packet transmission such as Received Signal Strength Indicator (RSSI) and Round-Trip Time (RTT). The RTT represents the round-trip time for the packet to be transmitted between the positioning AP and the terminal, and the RSSI represents the signal strength of an AP signal received by the terminal. Each of the positioning APs may feedback the measured values of the above parameters to the positioning server, and the positioning server may calculate the position of the terminal to be positioned according to the values of the parameters and the coordinates of each of the positioning APs. In another example, the positioning AP may also measure other parameters which may be used for positioning calculation by the positioning server. In yet another example, the positioning server may acquire the parameters corresponding to each of positioning APs from other devices after determining the positioning APs. For example, the positioning server may acquire from the access controller (AC) the RTT and RSSI of a signal to be transmitted between the positioning AP and the terminal to be positioned, and the RTT and RSSI may be acquired by the positioning AP and reported to the AC before the terminal positioning.

In examples of the disclosure, the positioning server may select a positioning AP by executing machine executable instructions. For example, the positioning server may be mounted with positioning monitor software. The positioning monitor software may acquire the coordinates of each of the APs in a monitor network and the initial position of the terminal to be positioned, and perform the process in FIG. 2 to acquire the positioning APs. The positioning server may have various realizing forms, for example, may be a cloud server, a switch or a terminal device. The realizing form of the positioning server is not limited as long as it may execute the functions of selecting an AP to position a terminal according to the examples of the disclosure. Referring to FIG. 3, the schematic hardware configuration of the positioning server may include a processor 310, machine readable storage medium 320, a communication interface 330 and a bus 340. The processor 310, the machine readable storage medium 320 and the communication interface 330 may communicate with each other through the bus 340. The processor 310 may perform the process for selecting a positioning AP by invoking and executing the machine readable instructions corresponding to control logic for positioning AP selection which are stored in the machine readable storage medium 320. The machine readable instructions in the machine readable storage medium 320 may be referred to as a device for selecting a positioning AP. The device for selecting a positioning AP may be, for example, the above-mentioned positioning monitor software, or part of functional modules in the positioning monitor software.

Figure 4:
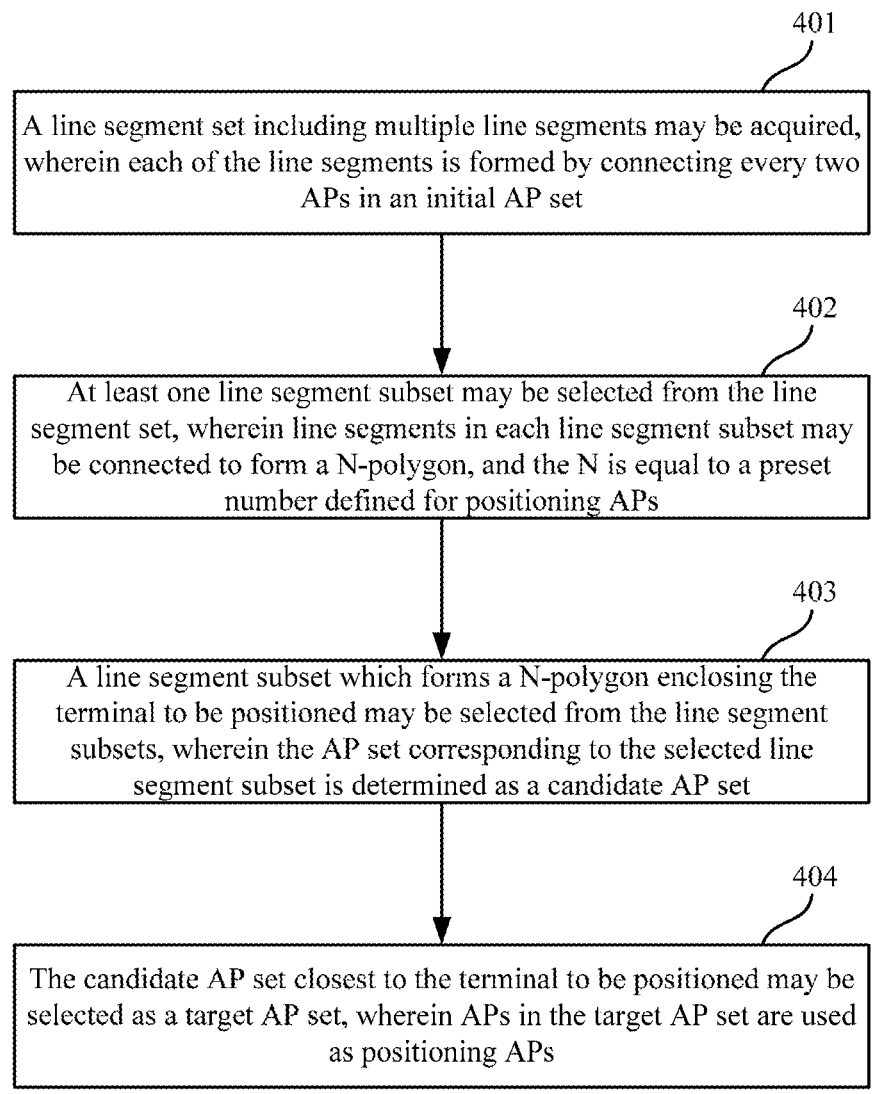
FIG. 4 illustrates a process for selecting a positioning AP according to an example of the disclosure.

FIG. 4 combined with FIGS. 5-8, describes a process for selecting a positioning AP which is performed by a device for selecting a positioning AP.

At block 401, a line segment set including a plurality of line segments may be acquired, wherein each of the line segments is formed by connecting every two APs in an initial AP set.

At block 402, at least one line segment subset may be selected from the line segment set, wherein line segments in each line segment subset may be connected to form a N-polygon, and the N is equal to a preset number defined for positioning APs.

At block 403, a line segment subset which forms a N-polygon enclosing the terminal to be positioned may be selected from the line segment subsets, wherein the AP set corresponding to the selected line segment subset is determined as a candidate AP set.

At block 404, the candidate AP set closest to the terminal to be positioned may be selected as a target AP set, wherein APs in the target AP set are used as positioning APs.

FIG. 4 is a flowchart illustrating a process for selecting a positioning AP according to an example of the disclosure. In the process illustrated in FIG. 4, to select four positioning APs as an example, the positioning server may select four positioning APs for positioning calculation of the terminal to be positioned. In this example, four positioning APs capable of enclosing the terminal to be positioned may be selected, and the selected positioning APs may be as close to the terminal to be positioned as possible. And wherein, the initial position of the terminal to be positioned may be roughly estimated according to the associated AP thereof.

Figure 5:
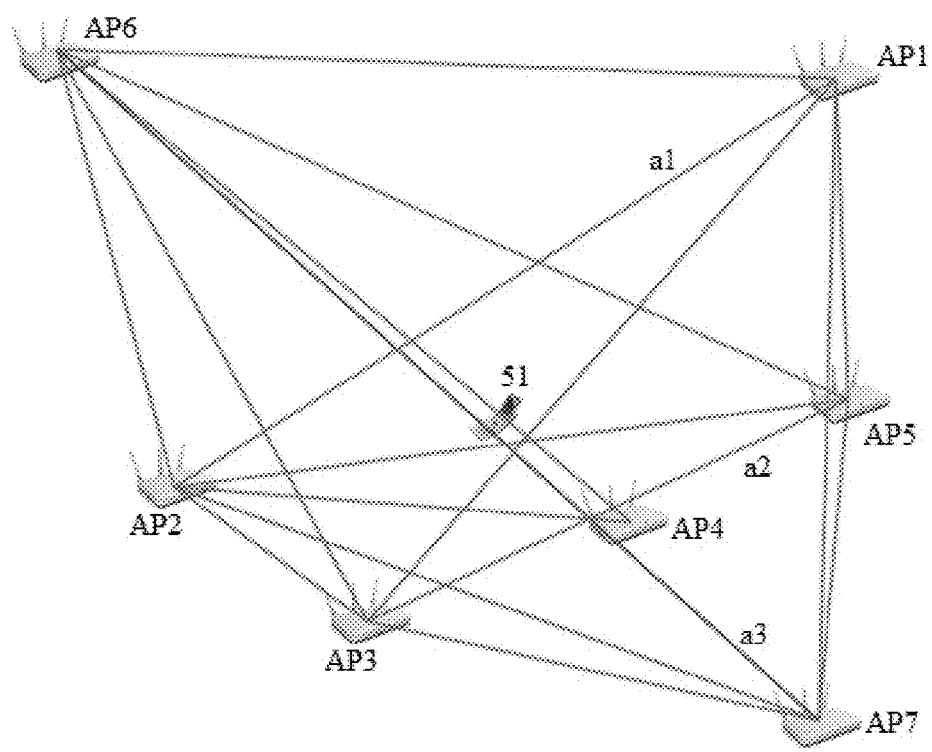
FIG. 5 schematically illustrates a step for selecting a positioning AP according to an example of the disclosure.

In block 401, suppose that the positioning server operates positioning monitor software, the positioning monitor software may load the coordinates of APs, wherein the APs may be APs deployed in the WLAN which the terminal to be positioned accesses, and may be APs in the initial AP set (e.g., part or all of APs in the initial AP set). Referring to FIG. 5, the number of the loaded APs in the initial AP set is for example seven and the terminal to be positioned is terminal 51. The coordinates of the AP may be two-dimensional coordinates. The two-dimensional coordinates of an AP may be relative coordinates of the AP in a two-dimensional positioning environment, and not necessarily actual longitude and latitude coordinates. For example, in order to locate the position of a mobile terminal in a warehouse, the warehouse may be viewed as a two-dimensional positioning environment, a coordinate origin may be set, and the two-dimensional coordinates with respect to the origin of each AP in the warehouse may be acquired.

In the examples of the disclosure, the positioning server may acquire multiple line segments by connecting every two of the above seven APs according to the loaded AP coordinates. As illustrated in FIG. 5, line segment a1 is formed by connecting AP1 and AP2, line segment a2 is formed by connecting AP3 and AP5, and so on. The operation of configuring line segments by connecting every two APs in the initial AP set uses the concept of "combination" in mathematics. For example, there are four APs whose coordinates are (x1, y1), (x2, y2), (x3, y3) and (x4, y4) respectively, and the formed line segments may be (x1, y1)-(x2, y2), (x1, y1)-(x3, y3), (x1, y1)-(x4, y4), (x2, y2)-(x3, y3), (x2, y2)-(x4, y4) and (x3, y3)-(x4, y4). All possible line segments formed by connecting every two APs in FIG. 5 may be referred to a line segment set. In an example, when the positioning server operates positioning monitor software as described above, the line segment set illustrated in FIG. 5 may be displayed in a form of visualized interface or may not be displayed. In another example, the positioning server need not draw the line segments in FIG. 5 explicitly. The "line segment" or "quadrilateral" described hereinafter are merely schematically shown for easier understanding of the technical solution according to the disclosure. According to the above mentioned content, the calculation in the positioning server has been based on the coordinates of each AP, but the positioning server may also adopt other calculation techniques as long as they conform to the principle illustrated in FIGS. 5-8.

In yet another example, some overlong line segments may be excluded from the line segment set illustrated in FIG. 5, so as to select the APs as close to the terminal 51 as possible. For example, a length threshold for line segment selection may be set. As an example, the interval between any two APs deployed in the WLAN may be within 1030 meters and the length threshold may be set slightly larger than the interval, for example, 30 meters or 50 meters.

The length threshold represents a desired maximum distance between two APs and may be determined according to the coordinates of the APs in the two-dimensional positioning environment. And it may achieve better positioning effect to use the APs between which mutual distance is less than the length threshold for terminal positioning. If the length of a line segment is equal to or greater than the length threshold, it may be removed from the line segment set. For example, in FIG. 5, the length of the line segment a3 formed by connecting AP 6 and AP 7 exceeds the length threshold and thus is removed from the line segment set.

In block 402, at least one line segment subset may be selected from the line segment set obtained in block 401, and line segments in the line segment subset may be connected to form a quadrilateral, that is, the line segment subset includes four APs. For example, referring to FIG. 6, three line segments subsets of [AP 1, AP 2, AP 3, AP 4], [AP 1, AP 2, AP 4, AP 5] and [AP 2, AP 3, AP 4, AP 5] may be selected. In this block, the positioning server may determine whether line segments in the selected line segment subset may form a convex quadrilateral. The convex quadrilateral may have such feature: the interior angles of the convex quadrilateral are all less than 180°, and if any sideline of the convex quadrilateral is extended from its two ends, the other sidelines may fall into the same side area of the extended sideline. Thus, a mathematic algorithm may be designed to implement the above determining process.

Figure 6:
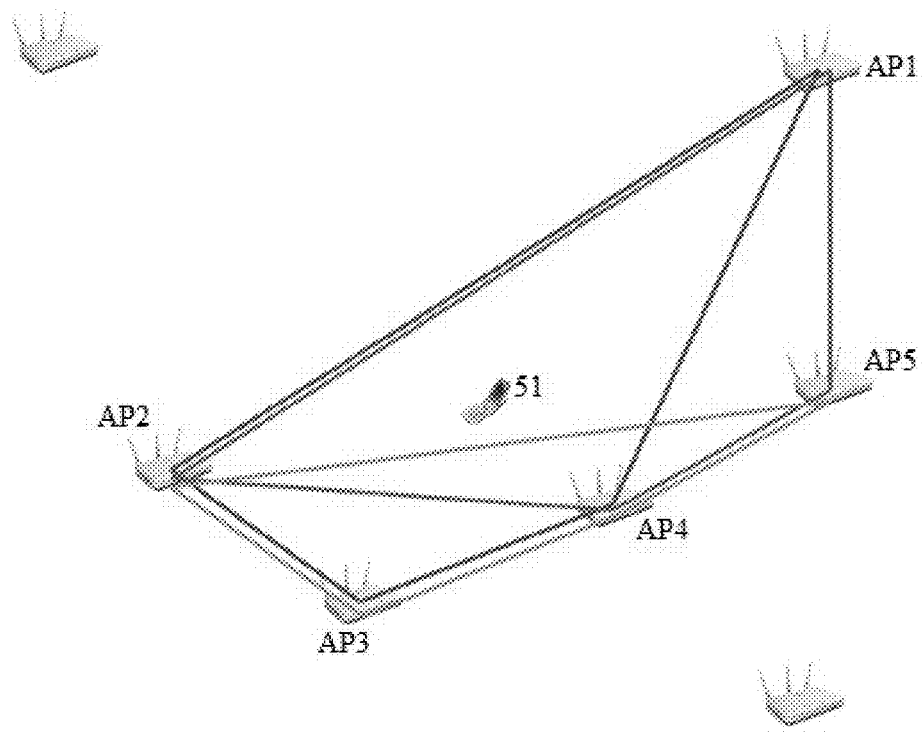
FIG. 6 schematically illustrates another step for selecting a positioning AP according to an example of the disclosure.

For example, a line segment subset which may form a convex quadrilateral may be selected from the line segment set acquired in block 401 in the following way. Firstly, two line segments which may form a quadrilateral may be selected. For example, any two line segments in the line segment set may be selected, wherein both ends of each line segment may correspond to two APs. Then the two line segments may be determined whether to share the same end point. If they do not share the same end point, it indicates that the two line segments may form a quadrilateral. As illustrated in FIG. 6, line segments "AP 1-AP 2" and "AP 3-AP 4" share no end point (i.e., there is no same AP), which indicates that the two line segments may form a quadrilateral. And line segments "AP 1-AP 2" and "AP 2-AP 3" share the same endpoint AP 2, which indicates that the two line segments cannot form a quadrilateral. Then the two line segments capable of forming a quadrilateral may be further determined whether to form a convex quadrilateral. If any sideline of the quadrilateral is extended from its two ends, and the other sidelines fall into the same side area of the extended sideline, then the quadrilateral may be a convex quadrilateral. In this example, the above three selected line segment subsets may all form a convex quadrilateral.

Figure 7:
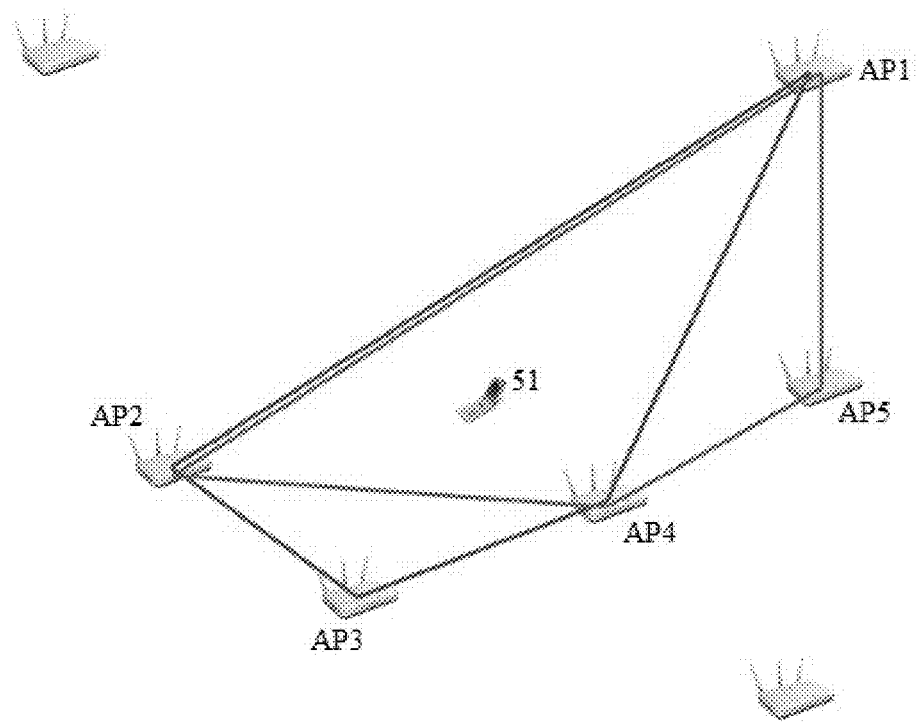
FIG. 7 schematically illustrates another step for selecting a positioning AP according to an example of the disclosure.

In block 403, the positioning server may further, from the three convex quadrilaterals of AP 1-AP 2-AP 3-AP 4, AP 1-AP 2-AP 4-AP 5 and AP 2-AP 3-AP 4-AP 5, select a convex quadrilateral enclosing the terminal 51 to be positioned, that is, select a line segment subset in which line segments may be connected to form a convex quadrilateral enclosing the terminal 51. If a line segment subset satisfies the above requirement for forming a convex quadrilateral enclosing the terminal, then the AP set corresponding to the line segment subset may be used as a candidate AP set. For example, as illustrated in FIG. 7, the convex quadrilaterals of AP 1-AP 2-AP 3-AP 4 and AP 1-AP 2-AP 4-AP 5 may enclose the terminal 51, then the AP sets corresponding to the two convex quadrilaterals may be used as candidate AP sets, i.e., the candidate AP sets [AP1, AP2, AP3, AP4] and [AP1, AP2, AP4, AP5].

In this block, the positioning server may determine whether the convex N-polygon (e.g. convex quadrilateral) acquired in block 402 may enclose the terminal 51 by the cross multiply algorithm in the vector calculation. The principle of the cross multiply algorithm is given as follows. Each side $a_j$ (j=0, 1, ..., N–1) of a convex N-polygon may be sequentially configured as a vector $V_j$ in a clockwise (or counterclockwise) direction. For each vertex $N_j$ of the convex N-polygon, a vector $Q_j$ may be configured from the vertex $N_j$ to the decision point O (for example, the terminal 51). Then the cross product of the two vectors $V_j$ and $Q_j$ with respect to each vertex $N_j$ may be obtained as a vector product $C_j$. If the vector product $C_j$ for each vertex $N_j$ indicates the same direction in the left-hand coordinate system or the right-hand coordinate system, the decision point O may be determined enclosed by the convex N-polygon. Other determination techniques may be also adopted besides the above cross multiply algorithm.

Figure 8:
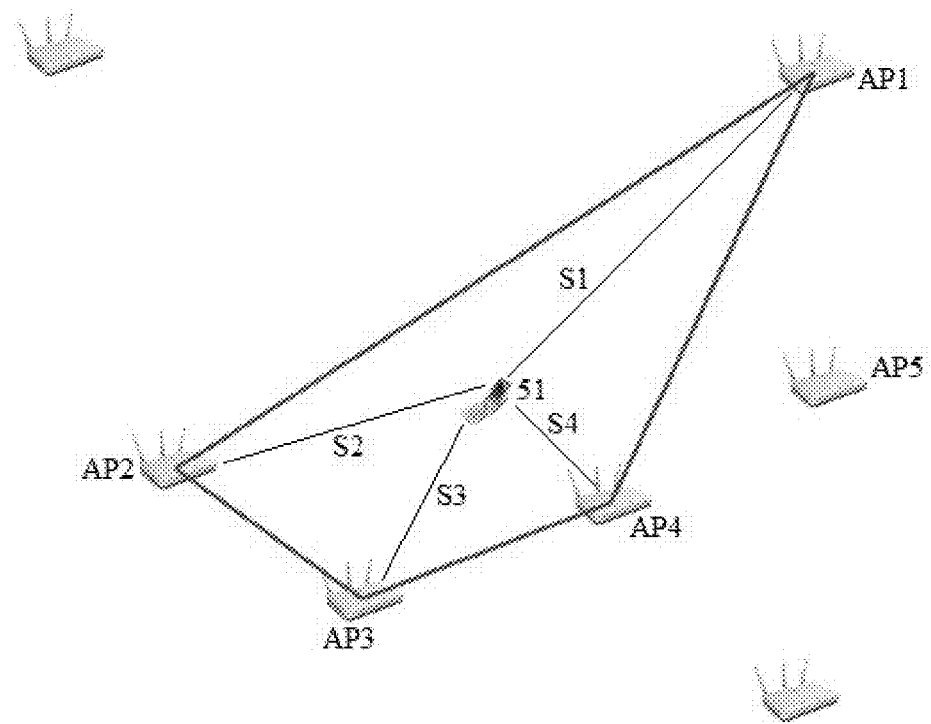
FIG. 8 schematically illustrates another step for selecting a positioning AP according to an example of the disclosure.

In block 404, the positioning server may further select a target AP set from the candidate AP sets enclosing the terminal 51 acquired in block 403, and APs in the target AP set may be used as positioning APs for positioning a terminal. For example, a candidate AP set closest to the terminal to be positioned may be selected as a target AP set. For example, as illustrated in FIG. 8, finally, the candidate AP set [AP 1, AP 2, AP 3, AP 4] may be determined as a target AP set, and then the AP 1, AP 2, AP 3 and AP 4 may be used as positioning APs.

For example, it may be determined which of the two candidate AP sets [AP 1, AP 2, AP 3, AP 4] and [AP 1, AP 2, AP 4, AP 5] acquired in block 403 is closer to the terminal 51 in the following way. Taking the AP set illustrated in FIG. 8 as an example, the distance from each AP to the terminal 51 may be calculated, and the distance is termed as the first distance. When the coordinates of the AP and the initial position of the terminal are known, the first distance may be roughly estimated, and the first distance is equal to the length of the line segment having both endpoints corresponding to the AP and the terminal 51. For example, the first distance from the AP 1 to the terminal is s1, the first distance from the AP 2 to the terminal is s2, the first distance from the AP 3 to the terminal is s3, and the first distance from the AP 4 to the terminal is s4. Then, the average distance of the first distances may be calculated as the distance from the AP set to the terminal. For example, the distance from the candidate AP set of [AP 1, AP 2, AP 3, AP 4] to the terminal 51 is S=(s1+s2+s3+s4)/4. The calculation result shows that the distance from the candidate AP set of [AP 1, AP 2, AP 3, AP 4] to the terminal 51 is less than the distance from the candidate AP set of [AP 1, AP 2, AP 4, AP 5] to the terminal 51. Thus the candidate AP set of [AP 1, AP 2, AP 3, AP 4] illustrated in FIG. 8 may be used as a target AP set. Or a candidate AP set which has the smallest sum of distances from each of the APs in the candidate AP set to the terminal may be determined as a target AP set.

In other examples, the distance from an AP set to the terminal may be calculated and evaluated in other ways. The AP set closest to the terminal to be positioned is set as a target AP set in the examples of the disclosure. Or the AP set relatively closer (not closest) to the terminal to be positioned may be used for positioning the terminal (in such a case, although the positioning precision may be not so good as the AP set closest to the terminal, the positioning result is acceptable).

In yet another example, a candidate AP set in which each AP has a similar distance to the terminal to be positioned may be used as a target AP set. For example, there are two candidate AP sets D1 and D2, each of which includes three APs enclosing the terminal to be positioned. And wherein, the three APs in the D1 have a similar distance to the terminal to be positioned, and the three APs in the D2 have a greater distance differential to the terminal to be positioned (for example, two APs are closer to the terminal, and the remaining one AP is a little far from the terminal). Then D1 may be selected as a target AP set since the D1 has a better positioning effect than D2. The above distance evaluation may be to calculate the mean square deviation of the distances from each of the candidate AP sets to the terminal to be positioned, and select the candidate AP set having the smallest mean square deviation as a target AP set. And the calculation of the mean square deviation may adopt a common way, thus the description is omitted here.

In the examples of the disclosure, the terminal to be positioned and the APs may locate on the same positioning plane. For example, assume multiple APs are deployed in each floor of a multi-floored building, if a terminal on the third floor is to be positioned, the APs and the terminal to be positioned in a 2-dimensional positioning environment described in the previous examples (such as FIG. 5) are on the third floor, that is, on the same positioning plane. However, the same positioning plane is not strictly limited to the same plane. For example, a little difference in height may be allowed as long as the positioning process in the examples of the disclosure can be implemented.

In another example of the disclosure, the positioning server may in advance calculate which positioning APs may be selected for a terminal located in a preset region, and store the calculating result, that is, the correspondence between the preset region and the target AP set. Thus, when receiving a positioning request for a terminal located in a certain region, the positioning server may quickly find positioning APs corresponding to the terminal according to the stored calculation result, thus improving the positioning efficiency.

Figure 9:
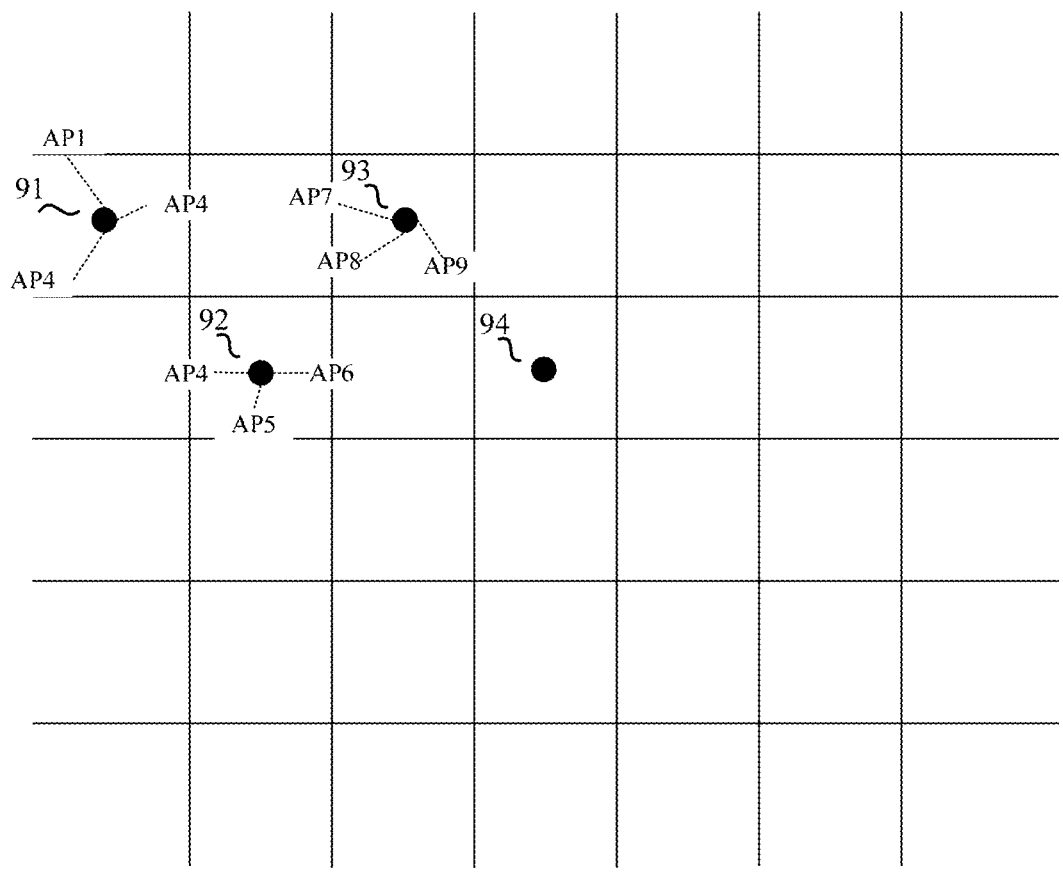
FIG. 9 is a schematic diagram illustrating pre-stored correspondence between a terminal to be positioned and positioning APs according to an example of the disclosure.

For example, referring to FIG. 9, suppose that the positioning server divides the 2-dimensional positioning plane into grids, such as grids 91, 92, 93 and 94. Each of the grids may represent a preset region on which a terminal may locate, and there may be no terminal located on some grids. As illustrated in FIG. 9, positioning APs of a terminal locating in the grid 91 may include AP 1, AP 2 and AP 3, and positioning APs of a terminal locating in the grid 92 may include AP 4, AP 5 and AP 6. The target AP set may be stored in associated with a preset region in which a terminal may be positioned by APs included in the target AP set. For example, a correspondence between the grid 91 and the target AP set including AP 1, AP 2 and AP 3 may be stored. When the positioning server receives a positioning request from a terminal (requesting the positioning server to position the terminal), an initial position of the terminal may be roughly estimated according to an AP associated with the terminal, the grid on which the terminal is located may be determined according to the initial position, and then the target AP set corresponding to the determined grid may be found by looking up the stored correspondence and the positioning APs in the target AP set may be used to position the terminal, thus quickening the positioning process.

Figure 10:
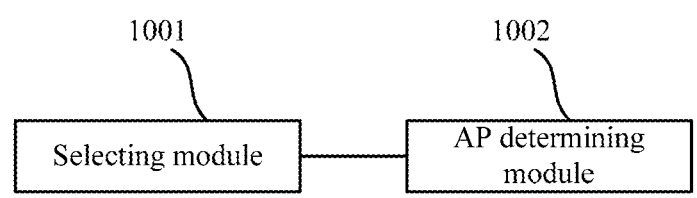
FIG. 10 is a block diagram illustrating functional blocks in a control logic for selecting a positioning AP according to an example of the disclosure.

According to the method for selecting a positioning AP in the above example, a device for selecting a positioning AP may be logically divided into modules as illustrated in FIG. 10. The device for selecting a positioning AP may include a selecting module 1001 and an AP determining module 1002.

The selecting module 1001 may acquire at least one candidate AP set from an initial AP set, wherein each of the at least one candidate AP set may include a preset number of APs enclosing the terminal to be positioned.

The AP determining module 1002 may select a target AP set from the at least one candidate AP set, wherein a distance from each of the APs in the target AP set to the terminal is less than a preset threshold, and the AP determining module 1002 may determine the preset number of APs included in the target AP set as positioning APs for positioning a terminal.

Figure 11:
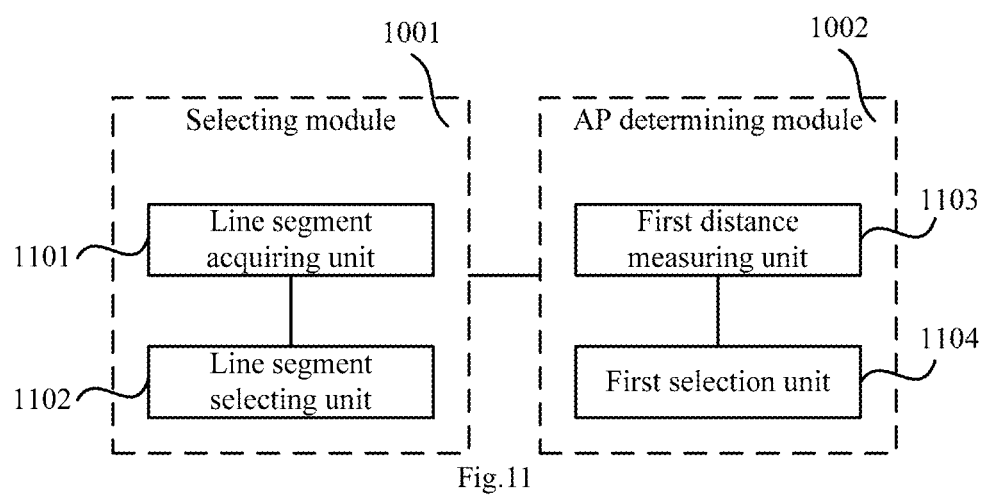
FIG. 11 is a block diagram illustrating functional blocks in a control logic for selecting a positioning AP according to another example of the disclosure.

In the device for selecting a positioning AP illustrated in FIG. 11, the selecting module 1001 may include a line segment acquiring unit 1101 and a line segment selecting unit 1102.

The line segment acquiring unit 1101 may acquire a line segment set including multiple line segments, wherein each of the line segments is formed by connecting every two APs in the initial AP set.

The line segment selecting unit 1102 may select at least one line segment subset from the line segment set. If the line segments in each of the at least one line segment subset may connect to form a N-polygon and the N-polygon may enclose the terminal to be positioned, the AP set corresponding to each line segment subset may be determined as the candidate AP set, and the N is equal to the preset number.

In another example, the line segment acquiring unit 1101 may further remove a line segment of a length equal to or greater than a length threshold from the above line segment set.

In yet another example, as illustrated in FIG. 11, the AP determining module 1002 may include a first distance measuring unit 1103 and a first selection unit 1104.

The first distance measuring unit 1103 may calculate, for each candidate AP set, the distances between each AP of the candidate AP set and the terminal to be positioned.

The first selection unit 1104 may select a candidate AP set closest to the terminal to be positioned as a target AP set based on the calculated distances.

Figure 12:
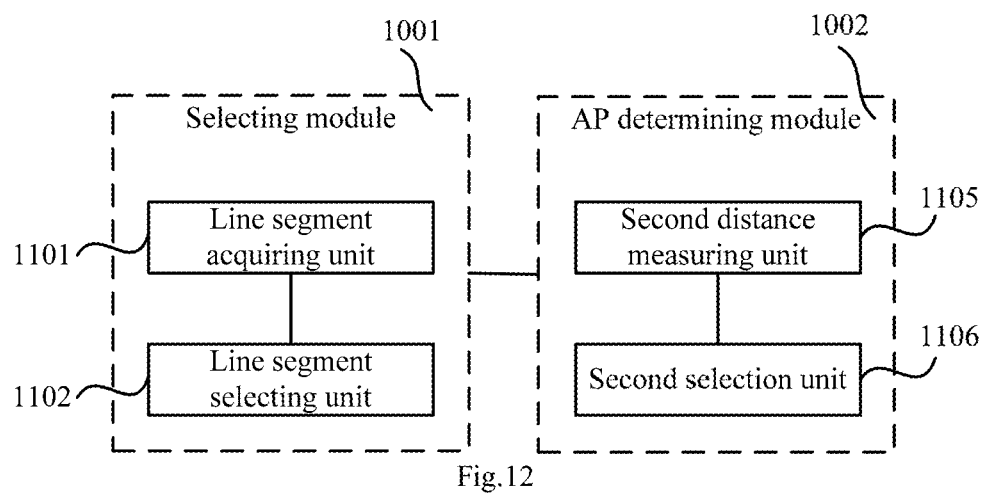
FIG. 12 is a block diagram illustrating functional blocks in a control logic for selecting a positioning AP according to another example of the disclosure.

Or in yet another example, as illustrated in FIG. 12, the AP determining module 1002 may include a second distance measuring unit 1105 and a second selection unit 1106.

The second distance measuring unit 1105 may calculate, with respect to each of the candidate AP sets, the mean square deviation of the distance between the candidate AP set and the terminal to be positioned.

The second selection unit 1106 may select a candidate AP set having the smallest mean square deviation as a target AP set.

For simplicity of description, the specific operating process of the above-mentioned device and units may refer to the description about corresponding process in the above method examples, thus omitted here.

The device and method in the examples of the disclosure are merely illustrative, and may also adopt other ways. For example, the device described above is merely illustrative, and the function units of the device are only a logical function division, and may also adopt other division techniques. For example, some units or components may be combined or integrated into another system, or some features may be omitted or not implemented. Besides, the illustrated or described direct or indirect coupling or communication connection may be through some communication interfaces, and the indirect coupling or communication connection between devices or units may be electrical, mechanical or in other form.

The units illustrated as separate components may be or may be not physically separate, and the component displayed as a unit may be or may be not a physical unit, that is, may be located in one place or distributed to multiple network units. Part or all of units may be selected to achieve the objective of the disclosure according to practical needs.

Further, the functional units in the examples of the disclosure may be integrated into one processing unit, or be separate physical units, or two or more units may be integrated into one unit.

If the functions in the device or method are implemented in software functional units and sold or used as an integrated product, these functions may be stored into a machine readable storage medium. Based on such understanding, the substantial part of the technical solution according to the disclosure, which make contributions to the prior art, or other part may be embodied in a software product. The software product may be stored into a storage medium, comprising instructions to cause a computer device (personal computer (PC), server or network device) to execute part or all of blocks in the method according to each of the examples in the disclosure. The above mentioned storage medium may include USB flash disk, mobile hard disk drive, read-only memory (ROM), random access memory (RAM), magnetic disk or optic disk or other storage medium which may store program codes.

The foregoing examples are merely illustrative but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for selecting a positioning access point (AP), including:
    acquiring, by a positioning server, at least one candidate AP set from an initial AP set, wherein each of the at least one candidate AP set includes a preset number of APs enclosing a terminal which is to be positioned;
    selecting, by the positioning server, a target AP set from the at least one candidate AP set,
    wherein a distance from each of the APs included in the target AP set to the terminal is less than a preset threshold; and
    determining, by the positioning server, the preset number of APs included in the target AP set as positioning APs for positioning the terminal, wherein further the acquiring of the at least one candidate AP set from the initial AP set, includes:
acquiring, by the positioning server, a line segment set including multiple line segments, wherein each of the line segments is formed by connecting every two APs in the initial AP set;
removing, by the positioning server, a line segment of a length equal to or greater than a length threshold in the line segment set; and
selecting, by the positioning server, a line segment subset from the line segment set, wherein, if a convex N-polygon enclosing the terminal is formed by connecting all line segments in the line segment subset, the AP set corresponding to the line segment subset is determined as the candidate AP set, and the N is equal to the preset number.

2. The method according to claim 1, wherein, acquiring the at least one candidate AP set from the initial AP set, includes:
acquiring, by the positioning server, a line segment set including multiple line segments, wherein each of the line segments is formed by connecting every two APs in the initial AP set;
removing, by the positioning server, a line segment of a length equal to or greater than a length threshold in the line segment set; and
selecting, by the positioning server, a line segment subset from the line segment set, wherein, if a convex quadrilateral enclosing the terminal is formed by connecting all line segments in the line segment subset, the AP set corresponding to the line segment subset is determined as the candidate AP set.

3. The method according to claim 1, wherein selecting the target AP set from the at least one candidate AP set, includes:
calculating, by the positioning server, for each of the at least one candidate AP set, a distance from each of the APs in the candidate AP set to the terminal; and
selecting, by the positioning server, according to the calculated distances, a candidate AP set closest to the terminal as the target AP set.

4. The method according to claim 1, wherein, after selecting the target AP set from the at least one candidate AP set, the method further includes:
storing, by the positioning server, a correspondence between a preset positioning region and the target AP set, and
determining, by the positioning server, according to the stored correspondence, the preset number of APs in the target AP set corresponding to the preset positioning region as positioning APs for positioning a target terminal matching the preset positioning region from which a positioning request is received.

5. The method according to claim 1, wherein, selecting the target AP set from the at least one candidate AP set, includes:
calculating, by the positioning server, for each of the at least one candidate AP set, a mean square deviation of distances from the APs in the candidate AP set to the terminal; and
selecting, by the positioning server, a candidate AP set having the smallest mean square deviation as the target AP set.

6. A device for selecting a positioning access point (AP), including:
a selecting module to acquire at least one candidate AP set from an initial AP set, wherein each of the at least one candidate AP set includes a preset number of APs enclosing a terminal which is to be positioned;
an AP determining module to select a target AP set from the at least one candidate AP set,
wherein a distance from each of the APs included in the target AP set to the terminal is less than a preset threshold; and
the AP determining module determines the preset number of APs included in the target AP set as positioning APs for positioning the terminal, wherein the selecting module includes:
a line segment acquiring unit to acquire a line segment set including multiple line segments, wherein each of the line segments is formed by connecting every two APs in the initial AP set;
the line segment acquiring unit removes a line segment of a length equal to or greater than a length threshold in the line segment set; and
a line segment selecting unit to select a line segment subset from the line segment set, wherein, if a convex N-polygon enclosing the terminal is formed by connecting all line segments in the line segment subset, the AP set corresponding to the line segment subset is determined as the candidate AP set, and the N is equal to the preset number.

7. The device according to claim 6, wherein, the selecting module includes:
a line segment acquiring unit to acquire a line segment set including multiple line segments, wherein each of the line segments is formed by connecting every two APs in the initial AP set;
the line segment acquiring unit removes a line segment of a length equal to or greater than a length threshold in the line segment set; and
a line segment selecting unit to select a line segment subset from the line segment set, wherein, if a convex quadrilateral enclosing the terminal is formed by connecting all line segments in the line segment subset, the AP set corresponding to the line segment subset is determined as the candidate AP set.

8. The device according to claim 6, wherein, the AP determining module includes:
a first distance measuring unit to calculate, for each of the at least one candidate AP set, a distance from each of the APs in the candidate AP set to the terminal; and
a first selection unit to select, according to the calculated distances, a candidate AP set closest to the terminal as the target AP set.

9. The device according to claim 6, wherein, the AP determining module includes:
a second distance measuring unit to calculate, for each of the at least one candidate AP set, a mean square deviation of distances from the APs in the candidate AP set to the terminal; and
a second selection unit to select a candidate AP set having the smallest mean square deviation as the target AP set.

10. A positioning server including a processor and a non-transitory storage medium storing machine readable instructions corresponding to control logic for selecting a positioning AP, wherein the machine readable instructions are executed by the processor to:
acquire at least one candidate AP set from an initial AP set, wherein each of the at least one candidate AP set includes a preset number of APs enclosing a terminal which is to be positioned;
select a target AP set from the at least one candidate AP set, wherein, a distance from each of the APs included in the target AP set to the terminal is less than a preset threshold;

determine the preset number of APs included in the target AP set as positioning APs for positioning the terminal;

acquire a line segment set including multiple line segments, wherein each of the line segments is formed by connecting every two APs in the initial AP set;

remove a line segment of a length equal to or greater than a length threshold in the line segment set; and select a line segment subset from the line segment set, wherein, if a convex N-polygon enclosing the terminal is formed by connecting all line segments in the line segment subset, the AP set corresponding to the line segment subset is determined as the candidate AP set, and the N is equal to the preset number.

11. The positioning server according to claim 10, wherein, by executing the machine readable instructions, the processor is further caused to:

calculate, for each of the at least one candidate AP set, a distance from each of the APs in each candidate AP set to the terminal, and select a candidate AP set closest to the terminal as the target AP set according to the calculated distance; or calculate, for each of the at least one candidate AP set, a mean square deviation of the distance from the APs in the candidate AP set to the terminal, and select a candidate AP set having the smallest mean square deviation as the target AP set.

12. The positioning server according to claim 10, wherein, by executing the machine readable instructions, the processor is further caused to:

store a correspondence between a preset positioning region and the target AP set, and determine, according to the stored correspondence, the preset number of APs in the target AP set corresponding to the preset positioning region as positioning APs for positioning a target terminal matching the preset positioning region from which a positioning request is received.

* * * * *